United States Patent [19]

Van Doorn et al.

[11] Patent Number: 5,041,530

[45] Date of Patent: Aug. 20, 1991

[54] LINEAR COPOLYMER OF CO/OLEFIN HAVING SPIRO KETAL UNITS

[75] Inventors: Johannes A. Van Doorn; Olof Sudmeijer, both of Amsterdam, Netherlands; Pui K. Wong, Katy, Tex.

[73] Assignee: Shell Oil Company, Houston, Tex.

[21] Appl. No.: 442,089

[22] Filed: Nov. 28, 1989

[30] Foreign Application Priority Data

Nov. 28, 1988 [NL] Netherlands ............ 8802923

[51] Int. Cl.$^5$ ............................................ C08G 67/02
[52] U.S. Cl. ........................................ 528/392; 502/168
[58] Field of Search ........................................ 528/392

[56] References Cited

U.S. PATENT DOCUMENTS 3,694,412  9/1972  Nozaki ............................ 260/63 CQ

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |

*Primary Examiner*—Harold D. Anderson

[57] ABSTRACT

Regio-regular copolymers of carbon monoxide and an ethylenically unsaturated hydrocarbon are produced by contacting the carbon monoxide and hydrocarbon under polymerization conditions in the presence of a more active catalyst composition formed from a palladium compound, the anion of a strong non-hydrohalogenic acid and a tetraalkyl diphosphine ligand.

3 Claims, No Drawings

LINEAR COPOLYMER OF CO/OLEFIN HAVING SPIRO KETAL UNITS

FIELD OF THE INVENTION

The present invention relates to a novel process for the production of certain linear alternating polymers of carbon monoxide and an ethylenically unsaturated hydrocarbon of at least 3 carbon atoms. More particularly, the invention relates to a process for the production of such polymers wherein the units derived from the unsaturated hydrocarbon are attached to the units derived from the carbon monoxide in a regular head-to-tail manner.

BACKGROUND OF THE INVENTION

The class of polymers of carbon monoxide and olefin(s) has been known for some time. Brubaker, U.S. Pat. No. 2,495,286, produced polymers of carbon monoxide, ethylene and optionally, additional olefinic monomers in the presence of free radical catalysts, e.g., peroxy compounds. The polymers had a relatively low carbon monoxide content. G.B. No. 1,081,014 produced similar polymers of somewhat higher carbon monoxide content in the presence of trialkylphosphine complexes of palladium compounds as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent processes for the production of the linear alternating polymers, now becoming known as polyketones or polyketone polymers, are illustrated by a number of published European Patent Application Nos. including 121,965, 181,014, 213,671 and 257,663. These processes generally involve a catalyst composition formed from a compound of a Group VIII metal selected from palladium, cobalt or nickel, the anion of a strong non-hydrohalogenic acid and a bidentate ligand of phosphorus, arsenic or antimony. The scope of the polymerization process is extensive but, without wishing to be limited, preferred catalyst compositions are formed from a palladium compound, the anion of a non-hydrohalogenic acid having a pKa below 2 and a bidentate ligand of phosphorus which is typically a tetraaryl diphosphine ligand. The resulting polymers have established utility as premium thermoplastics in the production of shaped articles by methods which are conventional for thermoplastics.

When copolymers of carbon monoxide and ethylene are produced, polymerization leads to a single type of product. Because of the lack of pedant groups in the ethylenically unsaturated hydrocarbon moiety, the geometry of the polymerization does not distinguish between the carbon atoms of the ethylene. When an olefin of three or more carbon atoms is employed in the production of linear alternating copolymers with the carbon monoxide, the geometry of the polymerization could lead to somewhat different products. If the majority of the propylene units combine with the moieties from carbon monoxide in a head-to-tail manner, i.e., a

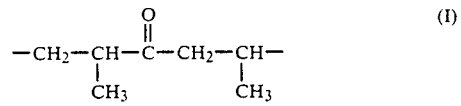

manner, the resulting polymer is termed regio-regular. If the combination is not in a predominantly head-to-tail manner the polymerization is termed regio-irregular. In U.S. Pat. No. 4,970,294, the polymerization of carbon monoxide and propylene is conducted in the presence of a catalyst composition formed from a compound of palladium, an anion of a strong non-hydrohalogenic acid and a tetraaryl phosphine as the bidentate phosphorus ligand. The resulting linear alternating copolymer of carbon monoxide is regio-irregular. The activity of the catalyst composition in the production of such copolymers is, moreover, relatively low as compared to polymerizations of ethylene. It would be of advantage to provide a more active catalyst composition for the production of linear alternating copolymers of carbon monoxide and an ethylenically unsaturated hydrocarbon of at least 3 carbon atoms.

SUMMARY OF THE INVENTION

The present invention provides an improved process for the production of novel linear alternating copolymers of carbon monoxide and an ethylenically unsaturated hydrocarbon of at least three carbon atoms. More particularly, the present invention provides a process wherein the moieties resulting from the ethylenically unsaturated hydrocarbon are attached to moieties resulting from the carbon monoxide in a regular head-to-tail manner. The moieties resulting from the carbon monoxide occur partly as keto groups and partly in a spiro ketal structure.

DESCRIPTION OF THE INVENTION

The improved process of the invention comprises the reaction of carbon monoxide and an ethylenically unsaturated hydrocarbon of at least three carbon atoms under polymerization conditions in the presence of a catalyst composition formed from a palladium compound, an anion of certain strong non-hydrohalogenic acids and a tetraalkyl diphosphine bidentate ligand.

The ethylenically unsaturated hydrocarbons useful in the polymerization process have up to 20 carbon atoms inclusive, preferably up to 10 carbon atoms inclusive, and are α-olefins such as propylene, 1-butene, isobutylene, 1-hexene and 1-dodecene. Preferred α-olefins are straight-chain α-olefins and particularly preferred as the ethylenically unsaturated hydrocarbon of at least 3 carbon atoms is propylene.

The palladium compound employed as a precursor of the catalyst compositions of the invention is preferably a palladium carboxylate and palladium compounds such as palladium acetate, palladium propionate, palladium hexanoate and palladium ortanoate are suitable. Palladium acetate is particularly preferred. The anion component of the catalyst composition is the anion of a non-hydrohalogenic acid having a pKa (measured in water at 18° C.) of below 2. Suitable anions include anions of inorganic acids such as sulfuric acid and perchloric acid as well as anions of organic acids including carboxylic acids such as trifluoroacetic acid, trichloroacetic acid and difluoroacetic acid, and sulfonic acids including methanesulfonic acid, p-toluenesulfonic acid and trichloromethanesulfonic acid. The anion is provided as the free acid or in the form of a metal salt, particularly a non-noble transition metal salt such as a copper salt or a nickel salt. In yet another embodiment, the palladium and the anion are provided as a single compound, e.g., palladium trifluoroacetate. The anions of trifluoroacetic acid and perchloric acid form a preferred class of anion components of the catalyst composition mixture. The anion is provided to the catalyst composition mixture in a quantity from about 0.5 mole to about 50 moles per mole of palladium but quantities of from about 1 mole to about 25 moles of anion per mole of palladium are preferred.

The tetraalkyl disphosphine component of the catalyst composition solution contains two alkyl substituents on each of the phosphorus atoms which are connected by a divalent aliphatic linking group. Such tetraalkyl diphosphines are represented by the formula

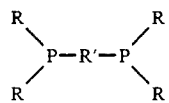
(II)

wherein R independently is alkyl of up to 10 carbon atoms inclusive, e.g., methyl, ethyl, n-butyl, sec-butyl, n-hexyl, t-octyl and decyl. The preferred R groups are straight-chain alkyl of up to 6 carbon atoms inclusive and particularly preferred as the R group is n-butyl. The R' term is a divalent alkylene group of up to 10 carbon atoms inclusive with from 2 to 4 carbon atoms in the bridge. Illustrative R' groups are 1,2-ethylene, 1,3-propylene, 1,3-(2,2-dimethyl)propylene and 1,4-butylene. Particularly preferred as R' is the 1,3-propylene or trimethylene group and the preferred tetraalkyl diphosphine ligand is 1,3-bis(di-n-butylphosphine)propane. The diphosphine ligand is provided to the catalyst composition mixture in a quantity of from about 0.5 mole to about 2 moles of ligand per mole of palladium. Preferred amounts of ligand are from about 0.75 mole to about 1.5 mole per mole of palladium.

It is useful on occasion to employ an organic oxidant in the catalyst composition mixtures in order to enhance the activity of the catalyst. The use of an oxidant is optional, but aliphatic nitrites, aromatic nitro compounds and quinones, both 1,2-quinones and 1,4-quinones, are suitable when an organic oxidant is utilized. The preferred organic oxidants are 1,4-quinones such as 1,4-benzoquinone and 1,4-naphthoquinone. Particularly preferred as the organic oxidant is 1,4-naphthoquinone. As stated the use of an oxidant is optional and is not required. However, amounts of organic oxidant up to about 5000 moles per mole of palladium are satisfactory with amounts of oxidant up to about 1000 mole per mole of palladium being more typically employed.

The polymerization is conducted by contacting the carbon monoxide and hydrocarbon reactants under polymerization conditions in the presence of the catalyst composition and a liquid reaction diluent. The molar ratio of unsaturated hydrocarbon to carbon monoxide is from about 10:1 to about 1:10 but preferably is from about 5:1 to about 1:5. The quantity of catalyst composition is sufficient to provide from about $1 \times 10^{-7}$ mole of palladium to about $1 \times 10^{-3}$ mole of palladium per mole of unsaturated hydrocarbon to be polymerized. Preferred amounts of catalyst are sufficient to provide from about $1 \times 10^{-6}$ mole to about $1 \times 10^{-4}$ mole of palladium per mole of unsaturated hydrocarbon. The reaction diluent is an inert diluent which is liquid under the conditions of the polymerization process and in which the catalyst composition is substantially soluble. Suitable reaction diluents include alkanols such as methanol and ethanol and ethers including acyclic ethers such as diethylene glycol diethyl ether and tetraethylene glycol dimethyl ether as well as cyclic ethers such as tetrahydrofuran and dioxane. Also suitable are mixed diluents such as mixtures of toluene and tetrahydrofuran. Typical polymerization conditions include a reaction temperature of from about 20° C. to about 100° C. with the temperature range from about 30° C. to about 85° C. being preferred. Suitable reaction pressures are from about 5 bar to about 150 bar although reaction pressures from about 20 bar to about 100 bar are more often employed.

The contacting of the carbon monoxide and hydrocarbon reactants and the catalyst composition is conducted in a suitable reactor by conventional methods such as shaking or stirring. After polymerization, the reaction is termined as by cooling the reactor and contents and releasing the pressure. The polymer product is recovered by well known procedures such as filtration or decantation which follow precipitation with a non-solvent if the polymer product is soluble in the product mixture. The polymer product is used as recovered or is purified as by contact with a solvent or extracting agent which is selective for catalyst residues.

The polymer product is a linear alternating polymer of carbon monoxide and the ethylenically unsaturated hydrocarbon in which the moieties from the unsaturated hydrocarbon are predominantly, i.e., in more than 50% of the cases, and preferably in more than 80% of the cases, attached to the moieties from the carbon monoxide in a head-to-tail manner. The moieties from the carbon monoxide are present as carbonyl groups or are present in a spiro ketal structure, i.e., the carbon atoms from the carbon monoxide are connected to adjacent carbon atoms from carbon monoxide by an oxygen atom and also by the carbon atoms of the ethylenic unsaturation of the unsaturated hydrocarbon reactant. If the ethylenically unsaturated hydrocarbon reactant is represented by the formula $CH_2=CHR$, in which R represents an alkyl group of up to 18 carbon atoms inclusive, the head-to-tail polymer product contains segments represented by the formula type

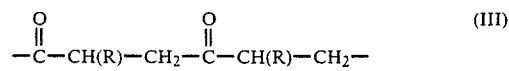
(III)

in the situation where the moiety from the carbon monoxide is present as carbonyl groups, and segments represented by the formula type

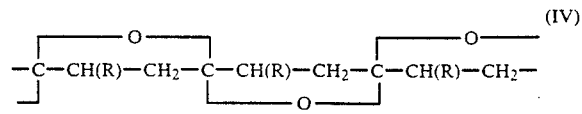
(IV)

in the case where the moiety derived from the carbon monoxide is present in a spiro ketal structure. In terms of propylene as the ethylenically unsaturated hydrocarbon of at least 3 carbon atoms the polymer product contains segments represented by the formula type

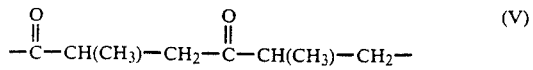

in the situation where the moiety from the carbon monoxide is present as carbonyl groups and segments represented by the formula type

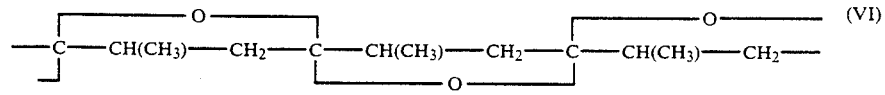

in the case where the moiety derived from the carbon monoxide is present in a spiro ketal structure. The proportion of segments of the V type and of the VI type will vary, but in both types of segment the moiety resulting from the propylene will be attached to the moiety from the carbon monoxide in predominantly a head-to-tail manner. The structure of copolymeric products from other ethylenically unsaturated hydrocarbons of at least 3 carbon atoms will be apparent from consideration of the structures of the hydrocarbon reactant and the polymer product segments as depicted above.

Of these structures, the spiro ketal structure (formula VI) is the less stable and converts to the keto structure (formula V) when possible. Analysis of the solid polymer by $^{13}$C-NMR indicates the presence of both types of structures. However, dissolution of the polymer as in hexafluoroisopropanol and $^{13}$C-NMR analysis of the resulting solution indicates the presence of only segments of the keto structure. Conversion of the spiro ketal form to the keto form is also effected by application of heat. The presence of moieties of the unsaturated hydrocarbon in head-to-tail configuration is independent of whether the moiety from the carbon monoxide is present in the keto or the spiro ketal configuration.

The process of the invention is characterized by a catalyst composition more active in the copolymerization of carbon monoxide and ethylenically unsaturated hydrocarbons to linear alternating polymers, and by the production of copolymers wherein the predominant structure is an attachment of moieties from the unsaturated hydrocarbon to the moieties from the carbon monoxide in a head-to-tail manner. The moieties from carbon monoxide are present in keto or carbonyl structures or in spiro ketal structures. The copolymers of the invention are thermoplastic polymers or relatively high molecular weight and are processed by methods conventional for thermoplastics, e.g., extrusion and injection molding, into articles of established utility such as sheets useful in packaging and containers for food and drink.

The present invention is further illustrated by the following Comparative Example (not of the invention) and the Illustrative Embodiments which should not be construed as limiting the invention. The polymer product, in each Illustrative Embodiment, was dissolved in hexafluoroisopropanol and upon examination by $^{13}$C-NMR analysis, was found to be of a linear, alternating structure with the units derived from carbon monoxide being present as ketone groups and at least 90% of the olefin reactant monomers attached to the carbonyl groups in a head-to-tail manner.

ILLUSTRATIVE EMBODIMENT I

A copolymer of carbon monoxide and propylene was produced by charging 110 ml of tetrahydrofuran and 80 ml of propylene to an autoclave of 300 ml capacity equipped with a mechanical stirrer. The contents of the autoclave were heated to 42° C. and carbon monoxide was introduced until a pressure of 40 bar was reached. A catalyst composition solution was then introduced which comprised 8.5 ml methanol, 21.5 ml tetrahydrofuran, 0.043 mmol palladium acetate, 0.21 mmol nickel perchlorate, 0.052 mmol 1,3-bis(di-n-butylphosphino)propane and 3.0 mmol 1,4-naphthoquinone. The resulting polymerization was terminated after 64.5 hour by cooling the autoclave and contents to room temperature and releasing the pressure. The reaction mixture was added, with stirring, to methanol and the copolymer which precipitated was recovered by filtration, washed with methanol and dried at 50° C.

The yield of copolymer was 63 g, produced at a rate of 214 g of copolymer/g Pd hr.

ILLUSTRATIVE EMBODIMENT II

A carbon monoxide/propylene copolymer was produced by a procedure substantially similar to that of Illustrative Embodiment I except that
 a) the propylene introduced to the autoclave was 87 ml instead of 80 ml,
 b) the catalyst composition solution comprised 8.5 ml methanol, 21.5 ml tetrahydrofuran, 0.052 mmol palladium acetate, 0.264 mmol nickel perchlorate, and 0.063 mmol 1,3-bis(di-n-butylphosphino)propane, and
 c) the reaction time was 140 hours.

The yield of copolymer was 11.5 g, produced at a rate of 15 g of copolymer/g Pd hr.

ILLUSTRATIVE EMBODIMENT III

A copolymer of carbon monoxide and propylene was produced by a procedure substantially similar to that of Illustrative Embodiment I except that the reaction temperature was 73° C. instead of 42° C. and the reaction time was 2.33 hours instead of 64.5 hours.

The yield of copolymer was 15.63 g, produced at a rate of 1470 g of copolymer/g Pd hr.

ILLUSTRATIVE EMBODIMENT IV

A carbon monoxide/propylene terpolymer was produced by a procedure substantially similar to that of Illustrative Embodiment I except that
 a) 110 ml of methanol and 91 ml of propylene were introduced to the autoclave instead of 110 ml of tetrahydrofuran and 80 ml of propylene,
 b) the catalyst composition solution comprised 6 ml methanol 0.012 mmol palladium acetate, 0.062 mmol nickel perchlorate, 0.014 mmol 1,3-bis(di-n-butylphosphino)propane and 3 mmol 1,4-naphthoquinone, and
 c) the reaction time was 67.05 hours.

The yield of copolymer was 33.32 g, produced at a rate of 388 g of copolymer/g Pd hr.

ILLUSTRATIVE EMBODIMENT V

A copolymer of carbon monoxide and propylene was produced by a procedure substantially similar to that of Illustrative Embodiment I except that
 a) 110 ml of methanol was initially charged to the autoclave instead of tetrahydrofuran,
 b) the catalyst composition solution comprised 30 ml methanol, 0.043 mmol palladium acetate, 0.902 mmol trifluoroacetic acid, 0.055 mmol 1,3-bis(di-n-butylphosphino)propane and 3 mmol 1,4-naphthoquinone, and
 c) the reaction time was 68.5 hours.

The yield of copolymer was 38 g, produced at a rate of 121 g of copolymer/g Pd hr.

ILLUSTRATIVE EMBODIMENT VI

A copolymer of carbon monoxide and 1-pentene was produced by charging 60 ml of 1-pentene to an autoclave of 300 ml capacity equipped with a mechanical stirrer. A catalyst composition solution was then added which comprised 11 ml methanol, 118 ml tetrahydrofuran, 0.061 mmol palladium acetate, 0.308 mmol nickel perchlorate, 0.074 mmol, 1,3-bis(di-n-butylphosphino)-propane, and 3.2 mmol 1,4-naphthoquinone. After carbon monoxide was added until a pressure of 40 bar had been reached, the contents of the autoclave were heated to 40° C. The resulting polymerization was terminated after 60 hours by cooling the autoclave and contents to room temperature and releasing the pressure. The product mixture was poured into methanol with stirring and the copolymer which precipitated was recovered by filtration, washed with methanol and dried at 50° C.

The yield of copolymer was 11.4 g, produced at a rate of 29.2 g of copolymer/g Pd hr.

ILLUSTRATIVE EMBODIMENT VII

A copolymer of carbon monoxide and 4-methylpentene-1 was produced by a procedure substantially similar to that of Illustrative Embodiment I, except that the autoclave contained 25 ml of 4-methylpentene-1 instead of 1-pentene and the reaction time was 40 hours. The yield of copolymer was 13.1 g, produced at a rate of 50 g of copolymer/g Pd hr.

COMPARATIVE EXAMPLE

A copolymer of carbon monoxide and propylene was produced by a procedure substantially similar to that of Illustrative Embodiment I except that
 a) 130 ml of tetrahydrofuran and 75 ml of propylene were initially introduced into the autoclave instead of 110 ml and 80 ml respectively,
 b) the catalyst composition solution comprised 27 ml of methanol, 9 ml of toluene, 0.06 mmol palladium acetate, 0.426 mmol nickel perchlorate, 0.072 mmol 1,3-bis[di(4-methoxyphenyl)phosphino]propane and 3 mmol 1,4-naphthoquinone, and
 c) the reaction time was 67.28 hours.

The yield of copolymer was 9.9 g; produced at a rate of 23 g of copolymer/g Pd hr. The polymer was dissolved in hexafluoroisopropanol and examined by $^{13}$C-NMR analysis. The polymer was regular and alternating, but less than 50% of the propylene units were attached to carbonyl units in a head-to-tail fashion.

ILLUSTRATIVE EMBODIMENT VIII

Each of the copolymeric products of Illustrative Embodiments I-VII was examined by $^{13}$C-NMR analysis in the solid state to determine what percentage of the units derived from carbon monoxide was present in carbonyl groups and what percentage was present as a spiroketal structure. The limiting viscosity number (LVN), as measured in m-cresol at 60° C., and the degree of polymerization by end group analysis ($\overline{DP}$) were determined for each of these products. The LVN and $\overline{DP}$ are qualitative measures of molecular weight. The results are shown in the Table. For comparison, the DP of the copolymer product of the Comparative Example was found to be 185.

TABLE

| Product of Illustrative Embodiment | 1 | 2 | 3 | 4 | 5 | 6 | 7 |
|---|---|---|---|---|---|---|---|
| % units in spiroketal structure | 25 | 75 | 10 | 10 | 30 | 75 | 75 |
| % units in ketone structure | 75 | 25 | 90 | 90 | 70 | 25 | 25 |
| LVN, dl/g | 0.77 | 1.0 | 0.14 | 0.45 | 0.51 | — | — |
| DP | 490 | 740 | | | | 34 | 56 |

What is claimed is:

1. A linear alternating copolymer of carbon monoxide and an ethylenically unsaturated hydrocarbon of at least 3 carbon atoms wherein at least 50% of the moieties from the unsaturated hydrocarbon are attached to moieties from carbon monoxide in a head-to-tail manner, the moieties from the carbon monoxide being present in keto groups, wherein the copolymer is represented by segments of the formula

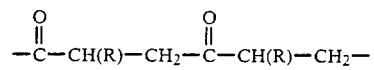

and in spiro ketal structures, wherein the copolymer is represented by segments of the formula

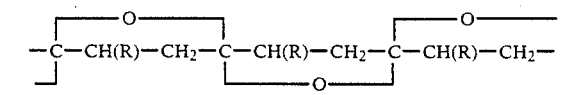

where R represents an alkyl group of up to 18 carbon atoms inclusive.

2. The linear alternating copolymer of claim 1 wherein the ethylenically unsaturated hydrocarbon is a straight-chain α-olefin of up to 10 carbon atoms inclusive.

3. The copolymer of claim 1 wherein the α-olefin is propylene and the copolymer is represented by segments of the formula

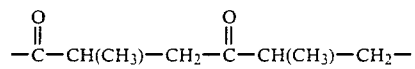

and segments of the formula.

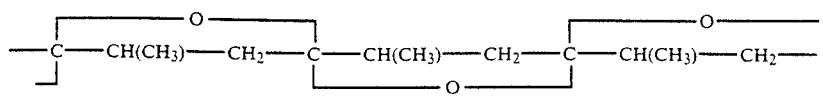
* * * * *